(12) United States Patent
Mattes et al.

(10) Patent No.: US 8,260,447 B2
(45) Date of Patent: Sep. 4, 2012

(54) METHOD OF PROVIDING AN IDENTIFIABLE POWDER AMOUNT AND METHOD OF MANUFACTURING AN OBJECT

(75) Inventors: Thomas Mattes, Gilching (DE); Ludger Hümmeler, Lennestadt (DE); Markus Frohnmaier, München (DE)

(73) Assignee: EOS GmbH Electro Optical Systems, Krailling (DE)

( * ) Notice: Subject to any disclaimer, the term of this patent is extended or adjusted under 35 U.S.C. 154(b) by 285 days.

(21) Appl. No.: 12/592,724

(22) Filed: Dec. 1, 2009

(65) Prior Publication Data

US 2010/0161102 A1    Jun. 24, 2010

(30) Foreign Application Priority Data

Dec. 2, 2008 (DE) .......................... 10 2008 060 046

(51) Int. Cl.
- *G06F 19/00* (2011.01)
- *B29C 35/08* (2006.01)
- *H05B 6/00* (2006.01)

(52) U.S. Cl. .......... 700/118; 700/98; 700/163; 264/460; 264/497; 264/516

(58) Field of Classification Search .................. 700/98, 700/118, 163; 264/401, 460, 497, 512, 515–516
See application file for complete search history.

(56) References Cited

U.S. PATENT DOCUMENTS

| | | | | |
|---|---|---|---|---|
| 5,519,816 A * | 5/1996 | Pomerantz et al. | ........... | 345/419 |
| 5,534,104 A * | 7/1996 | Langer et al. | ........... | 156/275.5 |
| 5,902,537 A * | 5/1999 | Almquist et al. | ........... | 264/401 |
| 6,333,741 B1 * | 12/2001 | Snead et al. | ........... | 345/423 |
| 6,366,825 B1 * | 4/2002 | Smalley et al. | ........... | 700/120 |
| 6,391,245 B1 * | 5/2002 | Smith | ........... | 264/401 |
| 6,405,095 B1 * | 6/2002 | Jang et al. | ........... | 700/118 |
| 6,782,303 B1 * | 8/2004 | Fong | ........... | 700/119 |
| 7,882,438 B2 * | 2/2011 | Markham et al. | ........... | 715/736 |
| 2003/0067098 A1 * | 4/2003 | Newell et al. | ........... | 264/442 |

(Continued)

FOREIGN PATENT DOCUMENTS

DE    10 2006 023 484    11/2007

(Continued)

OTHER PUBLICATIONS

Mattes, "EOS International User Meeting 2008 Product News Polymere Laser-Sintering", Apr. 15, 2008, EOS Jan. 2008, ISM Jan. 2008, *Product News EOSINT P, Florian Pfefferkorn*, pp. 1-36.

*Primary Examiner* — Ramesh Patel
(74) *Attorney, Agent, or Firm* — Edwards Wildman Palmer LLP; George W. Neuner

(57) ABSTRACT

In a method of providing a material amount for a generative manufacturing method, a three-dimensional object (2) is formed by selectively solidifying layers of a material at locations corresponding to the cross-section of the object (2) in the respective layers. The quality of the manufactured objects is reproducibly recorded, thus, improving the method. At least one first material amount of a powder is provided, which is characterized by at least one feature. Data is detected, which relates to the at least one feature of the first material. Then, the data is stored, which relates to the at least one feature of the first material. Thus, the method can provide an identifiable powder amount used in manufacturing each layer of the object.

26 Claims, 4 Drawing Sheets

U.S. PATENT DOCUMENTS

Figure 1:
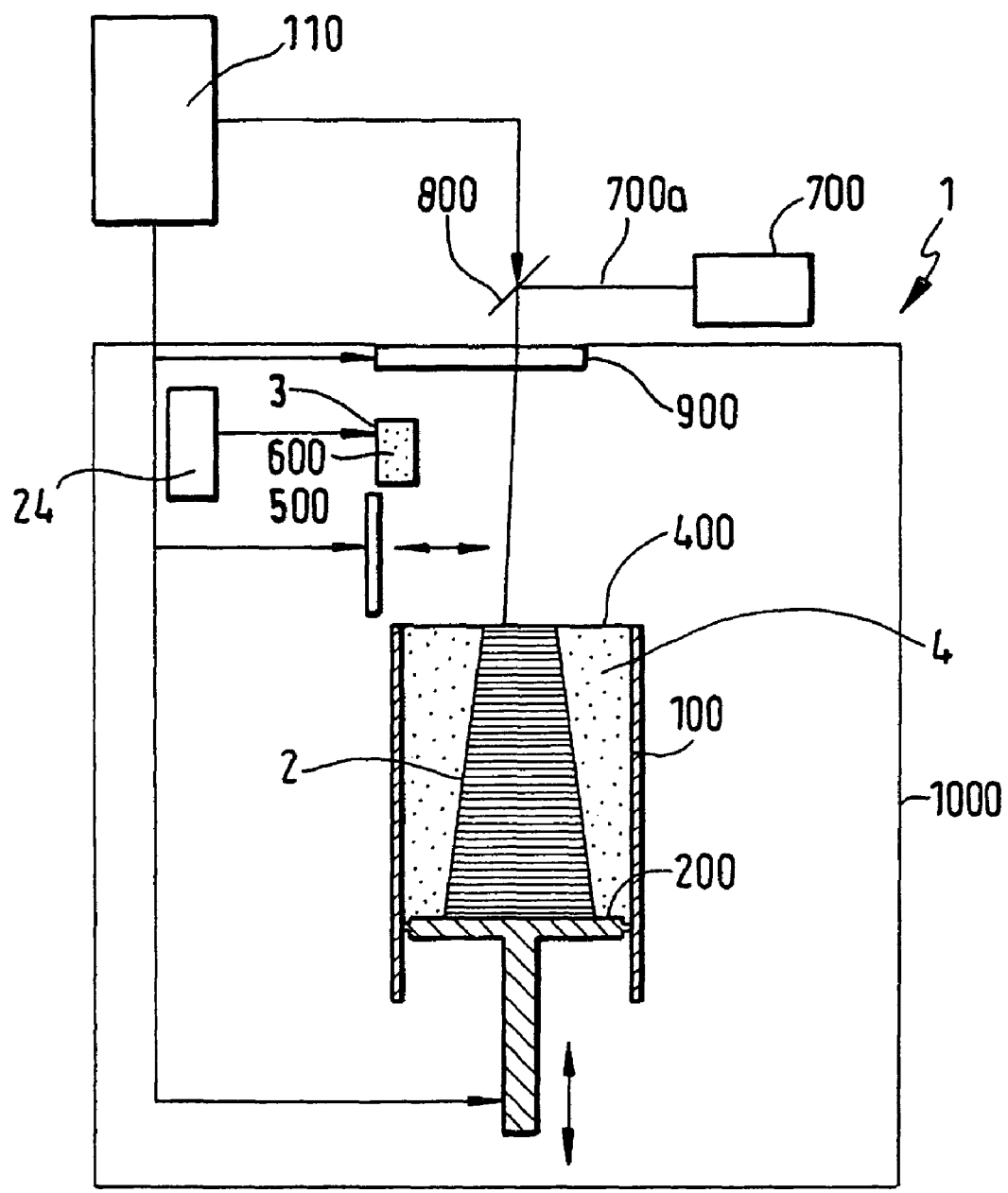

| Publication | Date | Inventor | Class |
|---|---|---|---|
| 2003/0150909 A1* | 8/2003 | Markham et al. | 235/376 |
| 2004/0006405 A1* | 1/2004 | Chen et al. | 700/119 |
| 2005/0053798 A1* | 3/2005 | Maekawa et al. | 428/542.8 |
| 2005/0253308 A1* | 11/2005 | Sherwood | 264/497 |
| 2006/0158456 A1* | 7/2006 | Zinniel et al. | 345/589 |
| 2006/0161287 A1* | 7/2006 | Simonis | 700/120 |
| 2007/0029693 A1* | 2/2007 | Wigand et al. | 264/113 |
| 2007/0229497 A1* | 10/2007 | Zinniel et al. | 345/419 |
| 2008/0018018 A1* | 1/2008 | Nielsen et al. | 264/308 |
| 2008/0109103 A1* | 5/2008 | Gershenfeld et al. | 700/119 |
| 2009/0025638 A1* | 1/2009 | Inoue | 118/712 |
| 2009/0045553 A1* | 2/2009 | Weidinger et al. | 264/497 |
| 2009/0236778 A1* | 9/2009 | Boot et al. | 264/572 |
| 2009/0252821 A1* | 10/2009 | Wigand et al. | 425/143 |
| 2010/0021638 A1* | 1/2010 | Varanka et al. | 427/271 |
| 2010/0038268 A1* | 2/2010 | Reynolds et al. | 206/232 |
| 2010/0047470 A1* | 2/2010 | Abe et al. | 427/553 |
| 2010/0121476 A1* | 5/2010 | Kritchman | 700/119 |
| 2010/0156003 A1* | 6/2010 | Wahlstrom | 264/401 |
| 2011/0195237 A1* | 8/2011 | Patel et al. | 428/195.1 |
| 2011/0241240 A1* | 10/2011 | Gothait et al. | 264/40.6 |
| 2011/0285052 A1* | 11/2011 | Wigand et al. | 264/219 |

FOREIGN PATENT DOCUMENTS

| | | |
|---|---|---|
| DE | 10 2007 006 478 | 8/2008 |
| EP | 1 700 686 | 9/2006 |
| EP | 1 790 463 | 5/2007 |
| EP | 1 938 952 | 7/2008 |
| WO | WO-03/058505 | 7/2003 |
| WO | 2006/041771 | 4/2006 |

* cited by examiner

METHOD OF PROVIDING AN IDENTIFIABLE POWDER AMOUNT AND METHOD OF MANUFACTURING AN OBJECT

The present invention relates to a method of providing a powder amount, in particular for laser sintering, and to a method of manufacturing a three-dimensional object, in particular by laser sintering.

In the field of layerwise building methods, in particular in laser sintering, the quality of the generated object depends on the quality and the characteristics of the used powder. The characteristics of the used powder are often not sufficiently known, since the composition of the powder is often not known by admixture of powder, so-called waste powder, which has already been used in previous manufacturing processes.

For determination of the powder characteristics, for example the so-called melt volume rate method (MVR) is used, where a molten mass of powder is generated and the viscosity of the molten mass of the powder is determined, which can give information about the age of the powder. Further, the melting point can be determined. However, this method is time-consuming and not applicable in all cases.

From DE 10 2006 023 484, devices and methods are known, by which the quality of objects to be manufactured by laser sintering can be improved, wherein a mix of fresh powder and waste powder is used.

It is the object of the present invention to provide a method of providing a clearly identifiable powder amount for layerwise building methods and a method of manufacturing a three-dimensional object, by which the quality of the manufactured objects is traceable recorded and thus further improved.

This object is achieved by a method according to claim 1 and by a method according to claim 12. Further developments of the invention are defined in the respective dependent claims.

It is an advantage of the inventive methods that it is known at any time which powder components have been used for a manufactured object. For example, the percentages of fresh powder and waste powder as well as the built total powder amount are known, and all data can be centrally managed by the IQMS (Integrated Quality Management System). The used powder and the objects built therefrom can be traced in a manner of a flow sheet up to the manufacturing.

The composition of each individual layer can be determined. The quality of the manufactured object is thus verifiable. By the quality control of the manufactured objects, which is performed in that manner, a corresponding certification (QMS) can be issued. Further, it is possible to relate the building parameters of the laser sintering machine to the characteristics of the used powder. Further, the laser sintering machine can be calibrated in accordance to the used powder.

It is a further advantage that reproducibility of the manufactured objects is ensured, since all parameters necessary therefore are known. This is required by many producing companies such as in aircraft industry, since very strict regulations have to be taken into account due to safety reasons.

It is a further advantage that maintenance staff and customers get insight with respect to reliability and workload of the machines by the recorded data. The conditions of the machine, the parameters thereof and irregularities and errors, respectively, are traceable, which may occur during a layerwise building method. Occurring problems can be quickly and economically solved by this manner.

Figure 2:
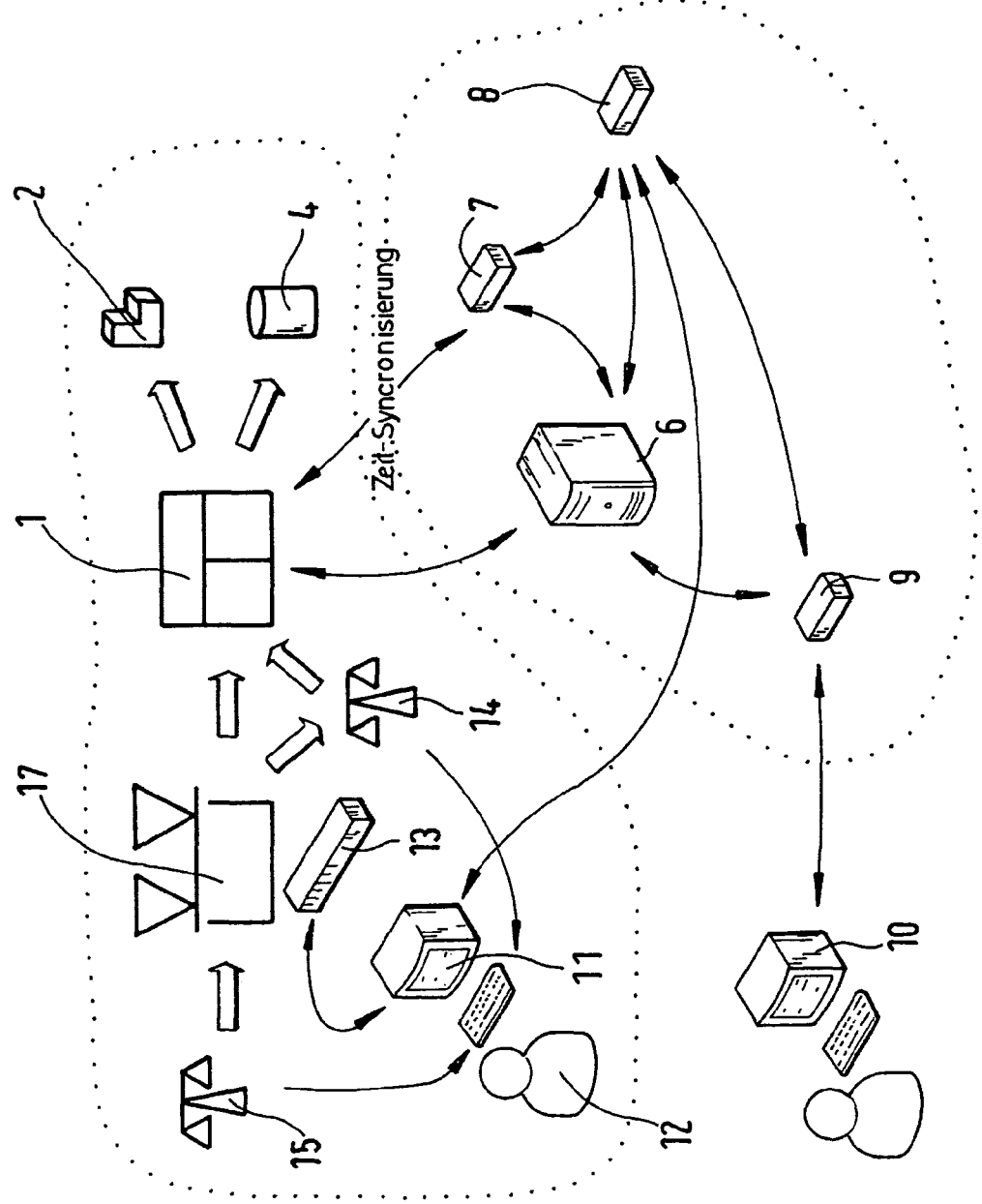
Figure 3:
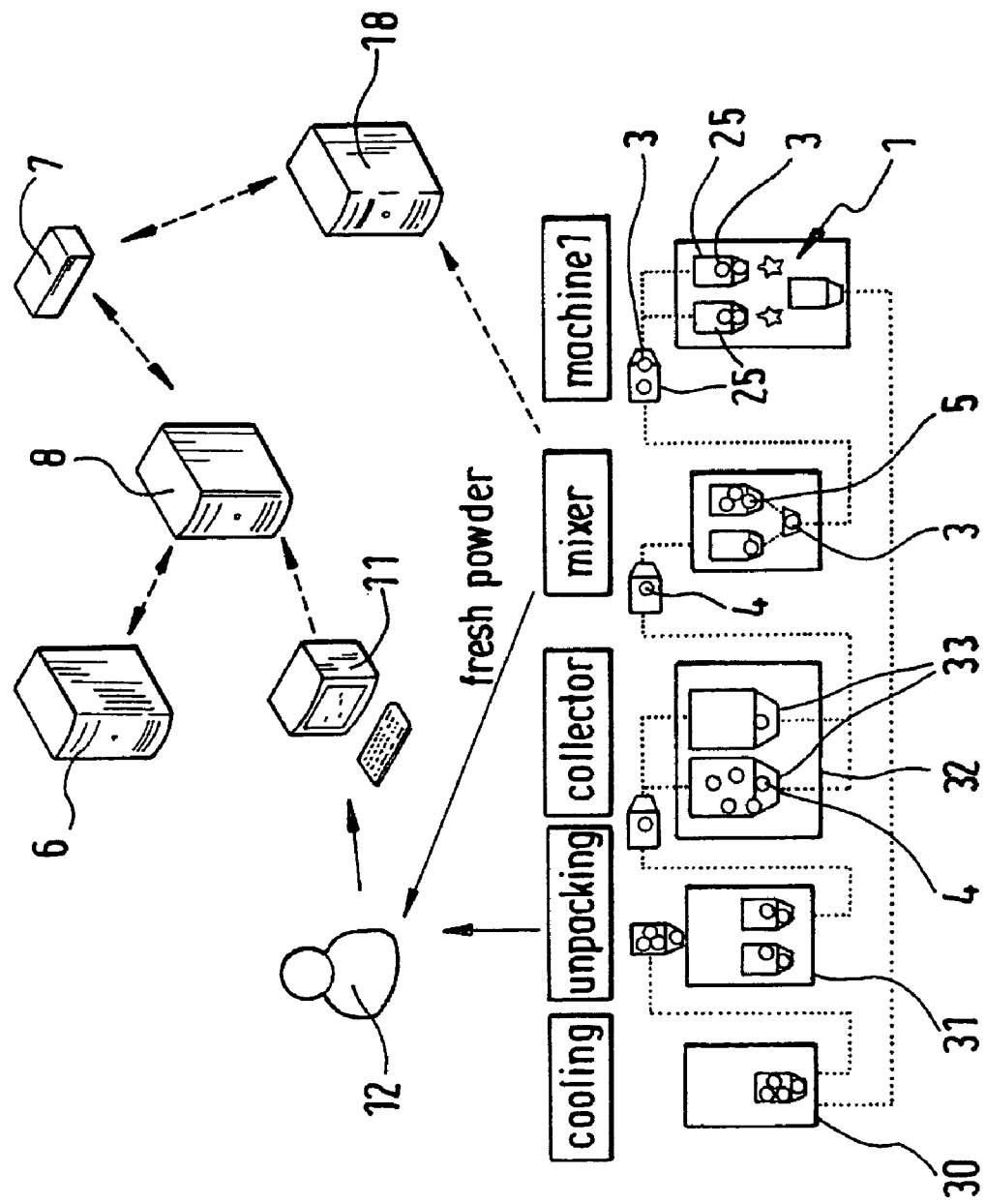
Figure 4:
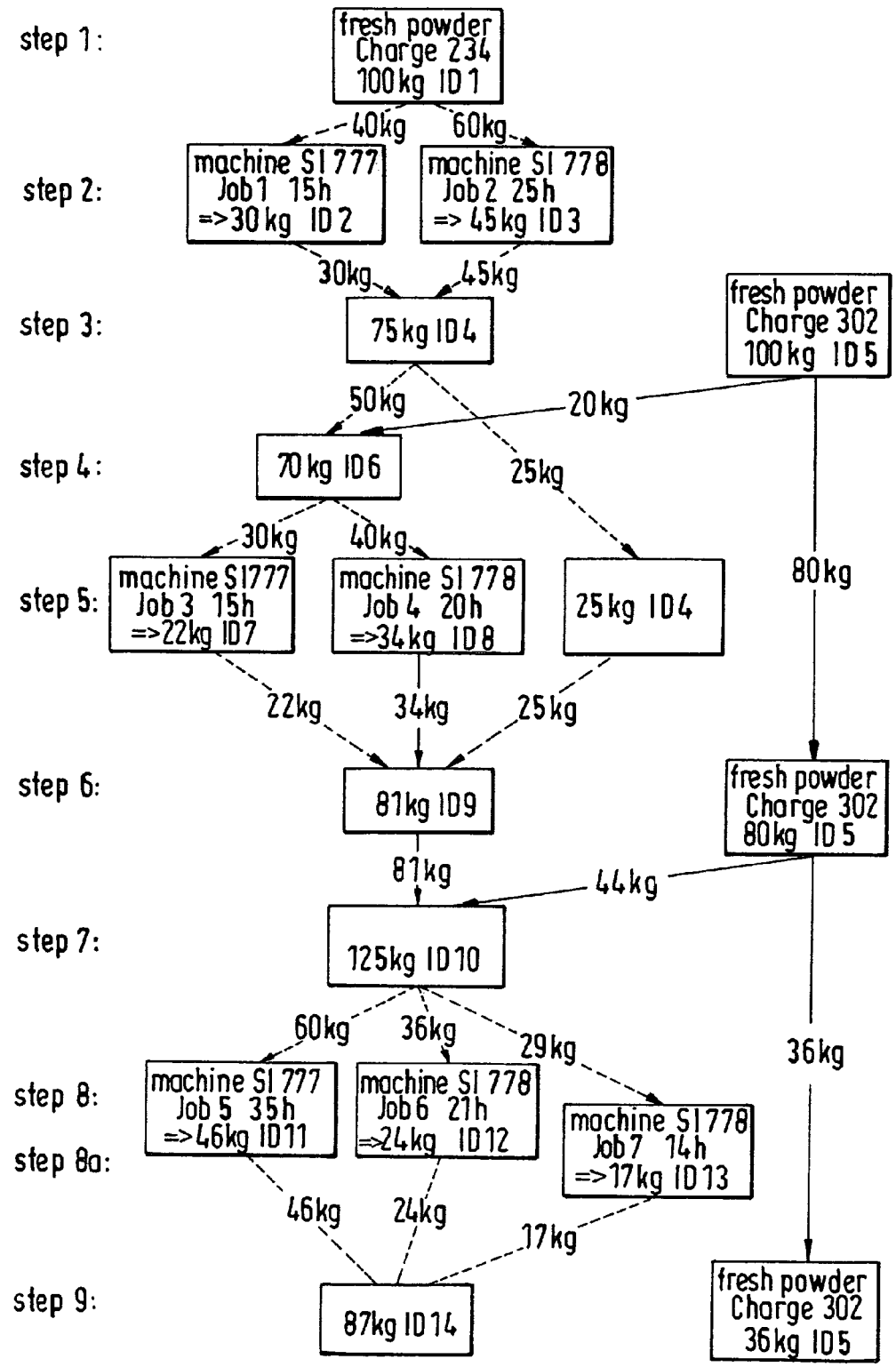

Further features and objects of the invention can be gathered from the description of embodiments on the basis of the attached figures. From the figures show:

FIG. 1 a schematic view of a laser sintering device,

FIG. 2 a schematic view of a system for providing a powder amount according to the invention, FIG. 3 a schematic view of a method according to the invention having the method steps of "cooling", "unpacking", "collecting", "mixing", "manufacturing", FIG. 4 an example of a material flow diagram.

In the following, a first embodiment as an example of laser sintering is described with respect to the figures.

The laser sintering device 1, as exemplary depicted in FIG. 1, has a building container 100, which opens to the top and has a support 200 being vertically movable therein, which supports the object 2 to be formed and defines a building field. The support 200 is set in the vertical direction such that the respective layer of the object 2 to be solidified lies within a working plane 400. Further, an applicator 500 for applying powder 3 is provided, which can be solidified by electromagnetical radiation. The powder 3 is supplied in a predetermined amount from a storage container 24 to the applicator 500 by a metering device 600. Further, a laser 700 is provided and generates a laser beam 700a, which is deflected by deflecting means 800 to an entrance window 900 and passed therefrom into the process chamber 1000 and focused to a predetermined point within the working plane 400. Further, a control unit 110 is provided, by which the components of the device can be controlled in coordinated manner to perform the building process.

For manufacturing the object 2, the powder 3 is applied by the applicator 500 in layers onto the working plane 400. The laser beam 700a selectively solidifies the powder 3 at locations corresponding to the cross-section of the object 2 in the respective layers. Thereafter, the movable support 200 is lowered, and the next layer of powder 3 is applied by the applicator 500 onto the working plane 400. The steps are repeated as often as possible until the object 2 is finished. The powder 3 can be a synthetic powder, a metallic powder, coated sand, ceramic powder, mixtures thereof or also a pasty powder composition of any powder.

The powder 3 which has already passed through one or several building processes, but has not yet solidified, is called waste powder 4 and has material characteristics altered by this process and by the heat entry involved therewith.

The method according to the invention detects at each building action, in which the object 2 is manufactured, the powder composition and therefore also the characteristics which can be gathered from this information. This information about the powder composition and the characteristics of the powder mixture are taken into account at the next building action for calibrating the building parameters and for possible certification (Quality Management System-QMS) of the work pieces.

FIG. 2 shows a schematic view of the system for providing a material amount and a powder amount, respectively, for performing the method according to the invention. All process data are managed in a central powder data base 6. The central powder data base 6 exchanges information with the laser sintering device 1 as well as with a watch dog and a time server 7, respectively. The time server 7 manages the chronological sequence of the manufacturing processes. This is important when more than one laser sintering devices 1 are used, for instance. The time server 7 in turn exchanges information with a powder tracking data base 8.

The powder tracking data base 8 records and monitors the used powder 3, that means, the used waste powder 4 as well as fresh powder 5 which is supplied to the system and has not yet passed any manufacturing process. In this manner, it is secured that it can be exactly determined, which powder composition is present in the generated objects 2. The powder tracking data base 8 is connected to the central powder data base 6 as well as to a terminal 11 which is either operated by a user 12 or controlled via software. The terminal 11 monitors the use of waste powder 4 as well as fresh powder 5. In the terminal 11, the data provided by the powder data base 6 cannot automatically entered by the user 12, such as the powder amounts and the characteristics thereof, which are discharged from or supplied to the system. Discharged powder 3, which is weighted by a first weighing machine 14, is provided with a label such as a RFID-chip, the label having a barcode or any other mark. In a similar manner, powder 3 can be introduced into the system by a weighing machine.

The individual amounts of the waste powder charges are built by the laser sintering device 1. Before that, the waste powder 4 can also be mixed with fresh powder 5 in a mixer 17. By selecting the mixing ratio, the material characteristics such as tensile strength, modulus of elasticity, thermal conductivity, etc. of the later-finished work piece can already be defined at this early stage. A complex individual analysis for determining the characteristics is thus superfluous at this process step. By the known mixing ratio, it is further possible to optimally set the parameters of the laser sintering device 1 for example with respect to the melting point of the used powder 3.

When fresh powder 5 is filled in the mixer 17, the user 12 and the RFID 13, respectively, transmit the information about the amount, the charge, etc. to the terminal 11, which transfers the information to the powder tracking data base 8, which in turn forwards the information to the powder data base 6.

The fresh powder 5 is weighted by a second weighing machine 15, before it is mixed with the waste powder 4. The used amounts of waste powder and fresh powder are centrally stored in the powder data base 6. The mixing ratio of waste powder and fresh powder is also stored therein. In this manner, the system knows at any time which powder 3 is built where, when and in which composition. The generated object 2 can be exactly determined with respect to its composition. For this purpose, a quality certificate (QMS) can be remitted by the manufacturer. The determination of the circulating powder amounts can be performed by the analysis of the generated objects 2, the parameters of the used metering means for supplying the powder 3, the area factor of the respective building processes, the building height, the mixing ratio of the powder 3 and the weighted amount of the fresh powder 5, for example.

Via an interface 9 and an IQM (Integrated Quality Management System) information centre 10, respectively, it is possible to check and maintain the system internally or externally. It is possible by means of the IQMS, to detect and record errors during the manufacturing process. Objects 2 are subsequently controlled, in which irregularities and errors have been detected during the manufacturing process. In this manner, a high quality (for example surface quality) of the manufactured parts can be secured and recorded. Moreover, monitoring of the laser behavior, the laser operation and the temperature distribution can be realized. The collected data are used by the manufacturer for further optimizing the processes and for remitting quality certificates. Furthermore, the manufacturing processes and the thus generated work pieces are reproducible.

Further, external components can be provided, which communicate with the system.

FIG. 3 shows an example of a method having several method steps "cooling", "unpacking", "collecting", "mixing", "manufacturing" (laser sintering device 1) of a first embodiment.

First, the laser sintering device 1 manufactures one object 2 or several objects 2 at the same time in a building action (job). This information is entered into the job data base 18 and then called by the time server 7. The time server 7 subsequently informs the powder tracking data base 8. In the meantime, the powder 3 is replenished in powder containers 25 of the laser sintering device 1, which are provided therefore. In the mixer 17, fresh powder 3 is generated by mixing waste powder 4 and/or fresh powder 5. The powder data base 6, which images the quantitative and qualitative powder track in the system, will be informed about how much of fresh powder is created, and the powder tracking data base 8 gets the information about which ID has been allotted to the created powder.

If the powder container 25 and/or the powder conveyance routes are empty, they are controlled by the powder tracking data base 8 and replenished with supported by the user 12 and the RFID 13, respectively.

It is possible to form the object 2 and the several objects 2, which are generated in one building action, by different powders 3. It is also possible to build each individual layer by a different powder 3. As soon as fresh powder 3 and a powder mixture different from the previously used powder mixture are supplied, respectively, it is recorded by the system, in which layer of the object 2 and the objects 2, respectively, that means in which building height, the powder 3 has been altered. By detection of the amount of the powder flow by the powder metering means in the laser sintering device 1, the system automatically recognizes, at which time a powder characteristic has been altered.

As soon as the building action is finished, this information is transmitted to the job data base 18 and will consequently be red by the time server 7. The time server 7 in turn informs the powder tracking data base 8 so that the built fresh powder 5 can be passed for calculation now. For example, this calculation can be performed in that the manufacturer of the objects 2 buys a contingent of fresh powder from the powder manufacturer and gets therefor a certain number of powder units such as kg-units, which are then used during the several building processes. In this manner, it is secured that only powder is used, which is tuned to the respective laser sintering device 1.

By finishing the building process, new identification numbers (ID's) for the non-built waste powder 4 and the manufactured objects 2 are generated. An ID is allocated to a specific powder amount, by which the handling sequence of the powder amount is reproducible. The powder tracking data base 8 informs the powder data base 6 about the changed powder amounts in the system. The powder 3 used for the generated object 2 leaves the system as an output. The generated object 2 is taken from the building container 100 (see FIG. 1) for cooling and transported in the cooling station 30. As soon as the object 2 is cooled-off, it is further conveyed to the unpacking station 31. During unpacking, respective ID's for each object 2 and each waste powder 4 result from the several generated ID's.

A collector 32 is provided, which comprises two waste powder collecting containers 33. As soon as one of the waste powder collecting containers 33 is full, this one will be stirred. In order to achieve a constant mixture, the waste powder 4 is transported to the other waste powder collecting container 33 and collected there. Thus, the mixer 17 is only supplied with the analyzed waste powder 4. For example, it is also conceivable to store a specific powder 3 in order to build the same on demand. This secures the possibility of exact reproduction of specific work pieces and objects 2, respectively.

Since a plurality of mixtures can result after several manufacturing processes (jobs), it is advantageous to collect the waste powder 4 of several jobs, to mix them up thereafter, and to mix them again with fresh powder only thereafter. It is an advantage that the mixtures are kept comparable in this manner in order to secure a stable powder quality.

It is also conceivable to perform the method without collector 32.

Subsequently, the waste powder 4 is conveyed in the mixer 17 and, if applicable, mixed with fresh powder 5 there.

FIG. 4 shows an example of a material flow diagram including nine steps, which are described in the following.

The process is started by providing a charge of fresh powder. A part of the fresh powder 5 of this charge is used for one building action or for several building actions in one or several laser sintering machines 1. The fresh powder 5 is labeled by an identification number (ID) before, and it is quantitatively (indication of kg) managed in the system. The waste powder 4, which has not been solidified during the building action and the building actions, respectively, is used again in a later building action. The manufacturing duration is also detected by the system. The waste powders 4 of several building actions are mixed up to a new powder mixture. This new powder mixture gets a new ID, which is also detected by the system. The proportions of the composition of the powder mixture is known by the system.

In the further process steps, the generated mixtures of waste powders can be added with further fresh powder 5. This information is also detected by the system, for example by entering the amount of fresh powder in the terminal 11 (see FIG. 2). Each new powder mixture gets an own ID.

The difference in amount of the powder 3, for example from step 1 to 2 (100 kg input-75 kg output), is made up by the built powder 3, that means the object 2, and the loss powder due to cleaning and recovering actions, respectively.

In step 9, for example the powder ID 11 (46 kg), ID 12 (24 kg) and ID 13 (17 kg) from the machines are mixed. At this time, 87 kg powder 3 having ID 14 are obtained. This powder 3 ID 14 has portions of the charge 234 and the charge 302. The portion of the charge 234 has already passed three manufacturing processes, and the portion of the charge 302 has already passed two manufacturing processes and one manufacturing process, respectively. That means, a waste powder portion "of the first order" of the charge 302 (singular use) as well as a waste powder portion "of the second order" of the charge 302 (double use) are in the powder 3 ID 14.

The manufacturing process can arbitrarily be continued in this manner. In addition to the described laser sintering devices 1, further laser sintering devices 1 can be added, for example.

As minimum information for the material flow, an identification (for example an identification number) and the weight of the relevant powder amounts are required. Additional information such as a time stamp, that means a time of manufacturing and mixing, respectively, the machine number, the job information, the stay time of the powder 3 in the machine, the charge and information such as the present temperatures, material data, etc. can be supplemented, if applicable. By these material flow diagrams, the material composition and the alteration can be traced from each step. For example, the material of job 5 in the machine SI777 can be traced up to the first mixture. Thereby, it is possible to determine the powder composition of manufactured objects 2. Specific forms of the material flow by use of time stamps also enable one or several changes of the powder ID during a job in a laser sintering machine 1.

Further, the method according to the invention is not restricted to the use in a laser sintering machine. Rather, the method is applicable to any layerwise building methods, in particular to methods which use powder materials.

The invention claimed is:

1. A method of providing a material amount for a generative manufacturing method in which a three-dimensional object is formed by selectively solidifying layers of the material at locations corresponding to the cross-section of the object in the respective layers, the method comprising:
    providing at least one first material amount, which is characterized by at least one first material feature,
    detecting data, which relate to the at least one first material feature, and
    storing data, which relate to the at least one first material feature.

2. The method according to claim 1, further providing the material amount with an identification number (ID), by which a handling sequence of the material amount is reproducible.

3. The method according to claim 2, further identifying the first material feature by the identification number (ID) of the material amount.

4. The method according to claim 3, further comprising allocating the identification number(s) of the material amount (s) and the feature(s) of the material amount(s) to the object that is formed.

5. The method according to claim 1, further comprising the steps of:
    providing at least one second material amount, which contains at least a part of the first material amount and is characterized by at least one second material feature, and
    storing data, which relate to the at least one second material feature.

6. The method according to claim 5, wherein the second material feature is a feature selected from the kind of the material, or the composition of the material, or the age or the amount of the material.

7. The method according to claim 5, wherein the first material amount is fresh material, which has not been subjected to a manufacturing process, and the second material amount is waste material, which has been subjected at least one manufacturing process and has not been solidified therein.

8. Method according to claim 7, further characterizing the waste material by a RFID-chip.

9. The method according to claim 7, wherein the first material amount is a powder, the waste material is a waste powder, and the fresh material is a fresh powder.

10. The method according to claim 5, further comprising mixing the first material amount with the second material amount.

11. The method according to claim 1, wherein the first material feature is a feature selected from the kind of the material, or the composition of the material, or the age or the amount of the material.

12. The method according to claim 1, further comprising providing of a further material amount and storing the data of the further material amount.

13. The method according to claim 1, further comprising storing the data in an electronic data base.

14. The method according to claim 1, wherein the first material amount is fresh material, which has not been subjected to a manufacturing process, and further providing a waste material, which has been subjected at least one manufacturing process and has not been solidified therein.

15. Method according to claim 14, further characterizing the waste material by a RFID-chip.

16. The method according to claim 1, further comprising mixing the first material amount with a second material amount.

17. A method of manufacturing a three-dimensional object in which an object is formed by selectively solidifying layers of a material at locations corresponding to the cross-section of the object in the respective layers, the method comprising providing a material amount according to claim 1.

18. The method according to claim 17, further comprising a step of selective laser sintering.

19. The method according to claim 17, further comprising using a mixture of waste powder and fresh powder.

20. The method according to claim 17, wherein the method of providing a powder amount is used for at least one layer.

21. The method according to claim 17, further comprising recording the powder flow is recorded and/or controlling the powder flow by a feedback control during manufacturing of one or several objects.

22. The method according to claim 21, further comprising recording an input and an output, wherein the input is formed by supplied powder and the output is formed by the generated object and waste powder, and/or feedback-controlling the input and output.

23. The method according to claim 21, further comprising managing a plurality of actions for building objects at the same time.

24. The method according to claim 23, further comprising managing the plurality of building actions in a chronologically synchronized manner.

25. The method according to claim 17, wherein the first material amount is a powder selected from a polymer powder, and/or a metal powder, and/or a ceramic powder.

26. The method according to claim 1, wherein the first material amount is a powder selected from a polymer powder, and/or a metal powder, and/or a ceramic powder.

* * * * *